(12) United States Patent
Weng

(10) Patent No.: US 6,246,580 B1
(45) Date of Patent: Jun. 12, 2001

(54) POWER SUPPLY FOR COMPUTER SYSTEM

(75) Inventor: Hsien-Tang Weng, Taipei (TW)

(73) Assignee: Shin Jiuh Corp., Taipei Hsien (TW)

( * ) Notice: Subject to any disclaimer, the term of this patent is extended or adjusted under 35 U.S.C. 154(b) by 0 days.

(21) Appl. No.: 09/505,852

(22) Filed: Feb. 17, 2000

(30) Foreign Application Priority Data

Nov. 15, 1999 (TW) .............................................. 088219297

(51) Int. Cl.⁷ ..................................................... H05K 7/20
(52) U.S. Cl. ......................... 361/695; 361/690; 361/688; 361/694; 174/16.1; 312/223.2; 454/184
(58) Field of Search ................................... 361/683, 690, 361/724–730, 735, 736; 174/16.1, 17 R; 312/223.2; 456/184

(56) References Cited

U.S. PATENT DOCUMENTS

| | | | |
|---|---|---|---|
| 5,124,886 | * 6/1992 | Golobay | 361/727 |
| 5,332,306 | * 7/1994 | Babb et al. | 361/685 |
| 5,612,854 | * 3/1997 | Wiscombe et al. | 361/727 |
| 5,808,867 | * 9/1998 | Wang | 361/695 |
| 5,949,652 | * 9/1999 | McAnally et al. | 361/726 |
| 5,949,653 | * 9/1999 | Weng | 361/735 |
| 6,038,126 | * 3/2000 | Weng | 361/679 |
| 6,075,698 | * 6/2000 | Hogan et al. | 361/695 |
| 6,078,503 | * 6/2000 | Gallagher et al. | 361/725 |

* cited by examiner

*Primary Examiner*—Leo P. Picard
*Assistant Examiner*—Boris L. Chervinsky
(74) *Attorney, Agent, or Firm*—Bacon & Thomas, PLLC

(57) ABSTRACT

An improved power supply device for a computer system conforming to the specifications of PS/2 type includes a back-up power supply. A partition plate defines at least one set of compartments in a case and at least one set of power supply units is disposed in the compartments and connected with a power-control panel installed in the case. Each terminal edge at one open end of the case is bent inwardly to form an attachment portion; and a plurality of predetermined fastener-receiving portions is formed in the attachment portion. By the abovesaid architecture, the power supply device can be installed fixedly in a computer system by mounting fasteners to the fastener-receiving portions to thereby build a space spacing power supply device.

7 Claims, 5 Drawing Sheets

POWER SUPPLY FOR COMPUTER SYSTEM

BACKGROUND OF THE INVENTION

This invention relates to an improved power supply device for computer system, wherein each terminal edge of computer case is bent inwardly to form a fix-to-joint portion for fixedly jointing with a computer system in order to expand space available in the computer system.

In consideration of product circulation, design convenience, and component availability, most electronic and mechanical products are made in unified specifications.

Take a PS/2 type back-up power supply device for example, a conventional power supply device shown in FIG. 1 has one set of power supply units disposed in a computer case, wherein the inner wall of the case is cut and bent to form a plurality of compartments; a power-input port is arranged in one open end of the case for connecting with the power supply units; a power-control panel is sealed in the other closed end of the case; each terminal edge of the open end of the case is extended outwardly and bent to form a fix-to-joint strip for connecting to the computer system with fixing pieces to thereby build a back-up power supply device. However, such a build is imperfect in the following points:

1. The case of PS/2 type becomes larger owing to the outwardly bent fix-to-joint strip, which is liable to be deformed by impact and affect disposing space of relative components.

2. The heat dissipation efficiency is degraded in the closed case that may shorten lifetime of the power-control panel and the power supply units, and besides, the cut and bent case does not provide effective guideways for inserting the power supply units in the case properly, and the power-control panel is not protected against touch by people's hands or foreign goods.

3. As only one power-input port is available, therefore, in case of power failure or breakdown, the back-up type power supply device can not operate normally.

SUMMARY OF THE INVENTION

The primary object of this invention is to bend each terminal edge of an open end of a case inwardly to form a fix-to-joint portion respectively and form a plurality of joint portions in the fix-to-joint portion so that a power supply device can be fixed in a computer system with fixing pieces and the available space in the computer system can be expanded.

Another object of this invention is to provide one set of heat dissipation fans and a power-input port to each power supply unit so that an impaired component can be replaced independently.

A further object of this invention is to provide one set of correspondent guideways and slide tracks on the case and the power supply unit respectively for guiding the latter to slide in the former smoothly, and a power-control panel disposed between an air frame with vent openings and a shield board with heat dissipation holes that cooperate with a plurality of heat dissipation holes in the power supply units to thereby lower temperature in the case and protect the power-control panel against touch of people's hands or foreign goods.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
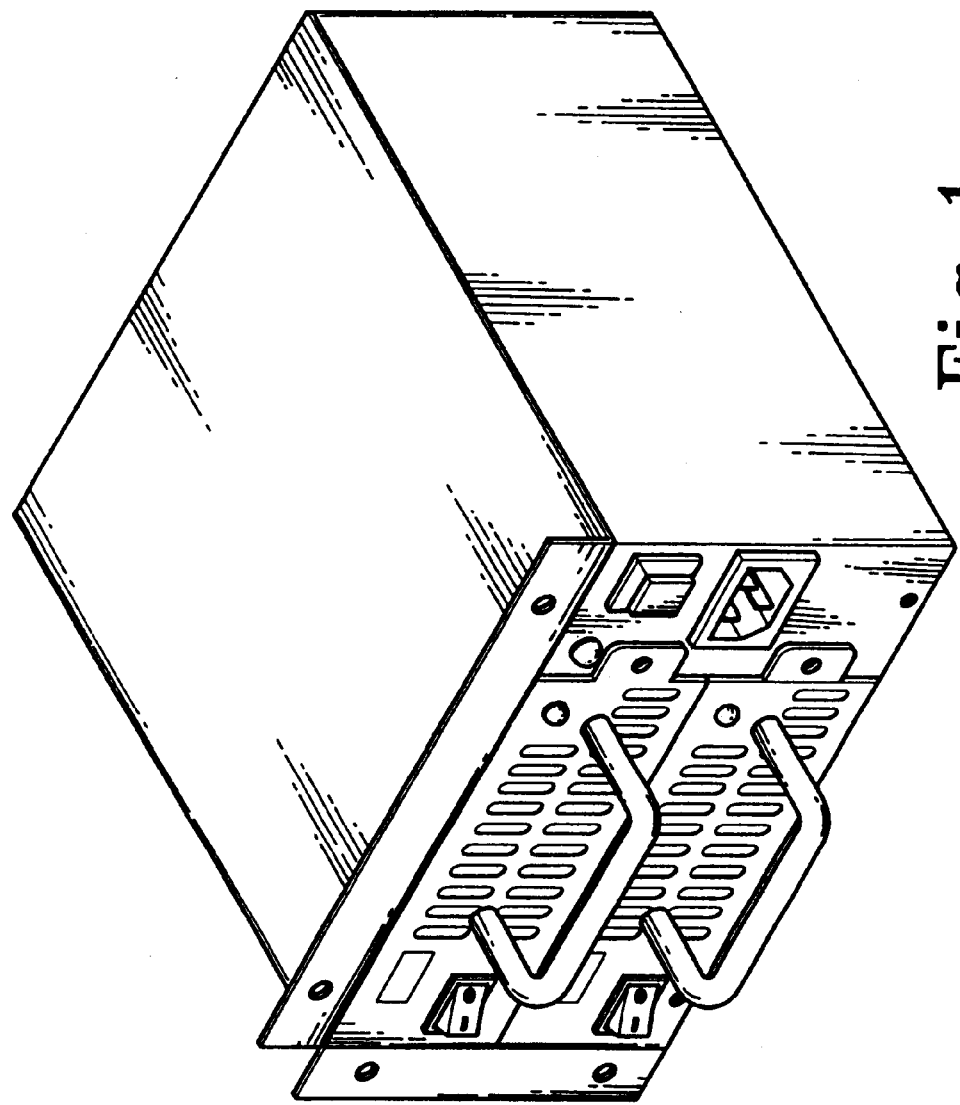
FIG. 1 is an assembled schematic view of a conventional back-up power supply device.
Figure 2:
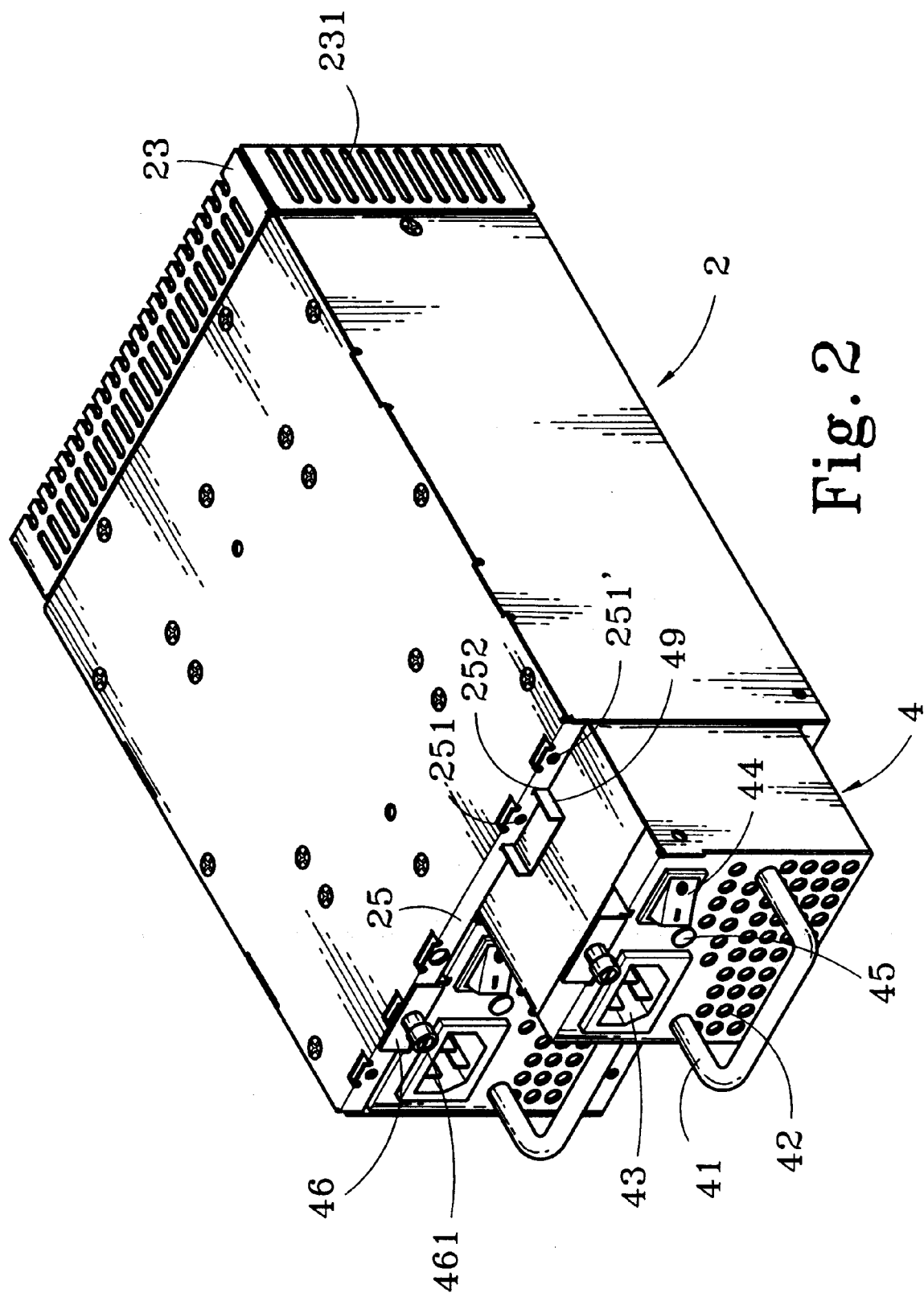
FIG. 2 is a perspective elevational view of this invention.
Figure 3A:
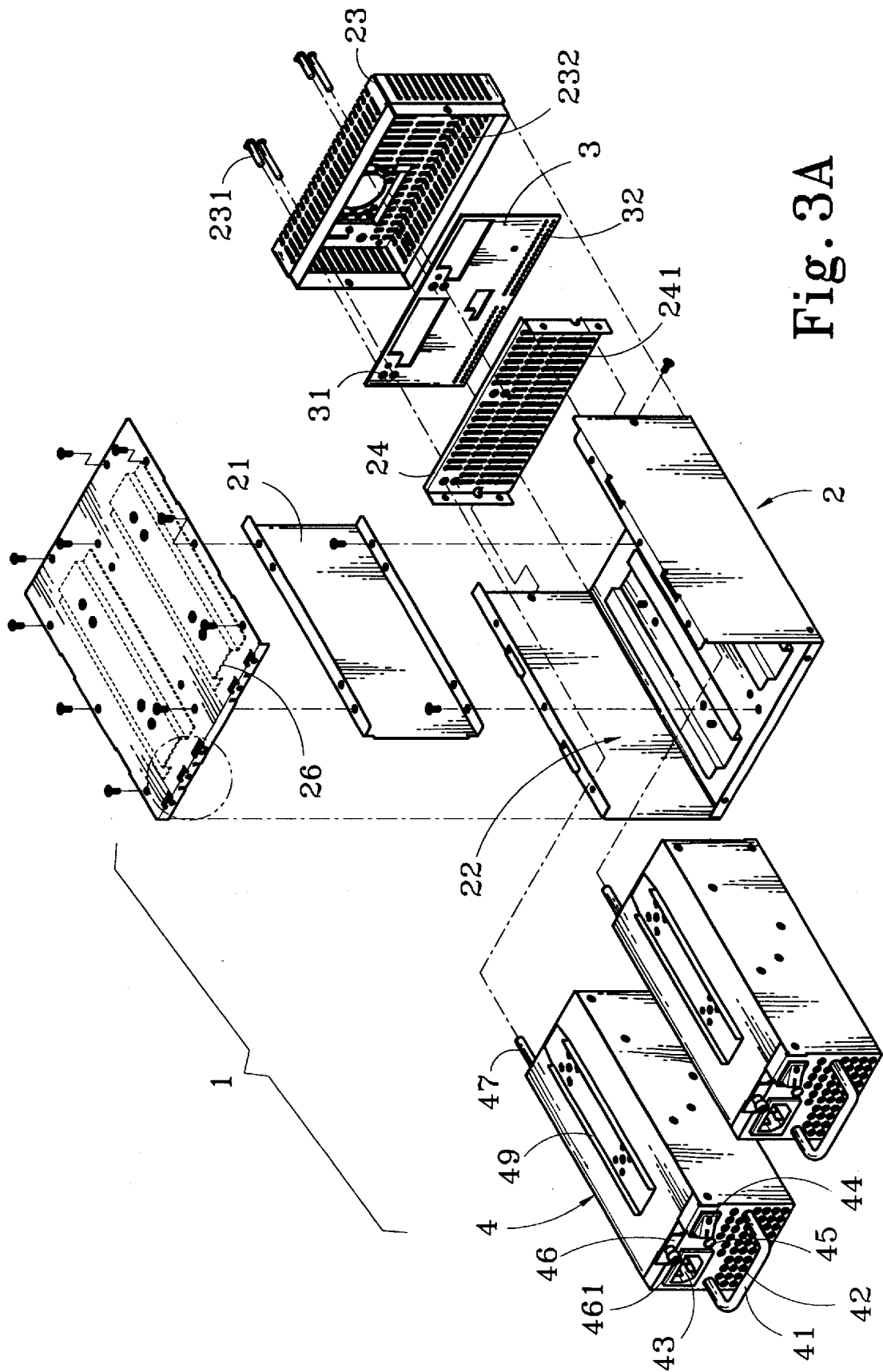
FIG. 3A is an exploded structural view of this invention.

As shown in FIG. 2 and 3A, this invention assembled and disposed in a computer system, such as a floppy disk drive (FDD) array, a network server, or an industrial or personal computer, for providing a back-up power supply device 1 conforming to specifications of P/S 2 type, comprises a case 2 and at least one set of power supply units 4 disposed therein.

Figure 3B:
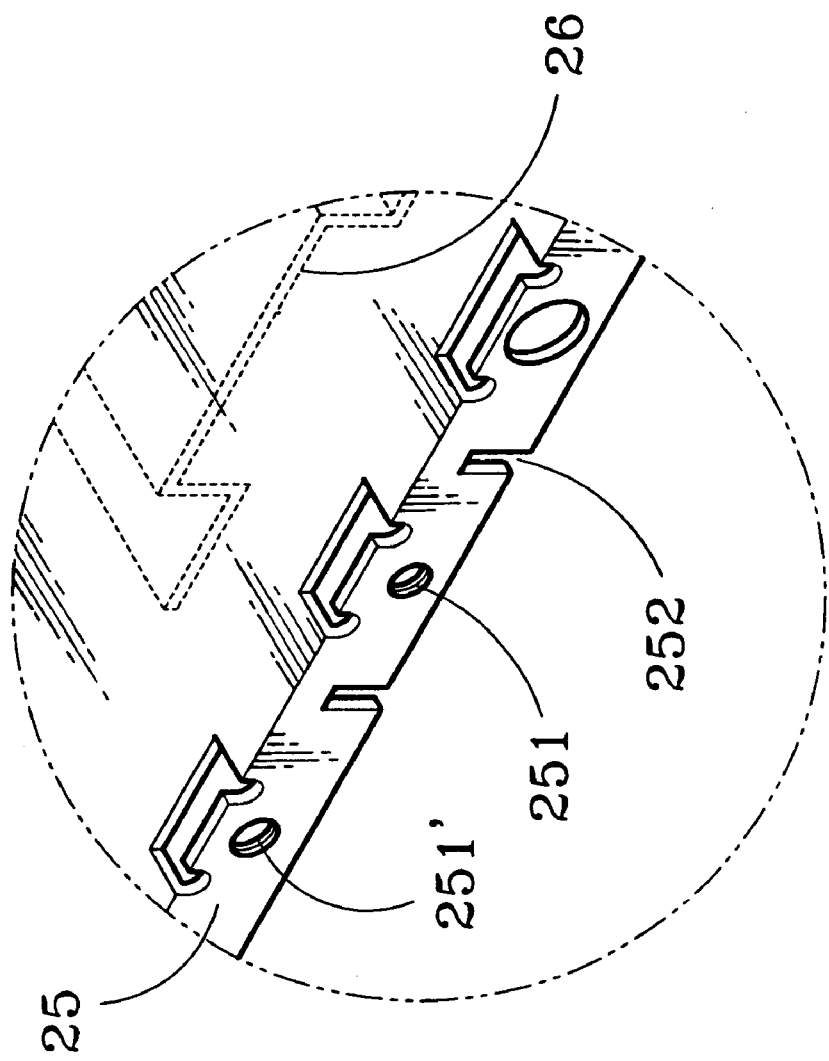
FIG. 3B is an enlarged partial structure of this invention.

In the abovesaid case 2, a partition plate 21 is used to define at least one set of compartments 22, wherein one end of the case 2 is fixedly jointed with an air frame 23 with vent openings 232 being provided with a protrusive positioning element 231 for assembling and jointing to a power-control panel 3; a shield board 24 having heat dissipation holes 241 is arranged between the power-control panel 3 and the compartments 22 to prevent people or foreign goods from touching the power-control panel 3; terminal edges in the other end of the case 2 are bent inwardly to form a fix-to-joint portion 25 (shown in FIG. 3B); and a plurality of predetermined joint portions 251, 251' in tapped holes or through holes is formed in the fix-to-joint portion 25.

The forgoing power supply unit 4 is placed in the compartment 22 and coupled with the power-control panel 3, wherein a U-type handgrip 41 is pivotally jointed to one end of the power supply unit 4 to form an extractable power supply unit 4, which is provided at the same end with a plurality of heat dissipation holes 42, a power-input port 43, an ON/OFF switch 44, a set of pilot lights 45, and a fix-to-mount portion 46 jointed with an assemble-to-joint piece 461 being disposed on top of the same end at a position corresponding with the joint portion 251 for being fixedly jointed to the latter in order to position the power supply unit 4 in the compartment 22 of the case 2. At the other end of the power supply unit 4, a protrusive positioning pin 47 is arranged for coupling with the power-control panel 3 by penetrating it through a positioning hole 31 in the latter at a corresponding position, and one set of heat dissipation fans 48 is also disposed at the same end. Moreover, one set of guideways 26 and slide tracks 49 reside on the inner wall of the compartment 22 and the outer wall of the power supply unit 4 respectively, and two gaps 252 are formed in the fix-to-joint portion 25 of the case 2 at positions corresponding to two wings of the slide tracks 49.

Using the abovesaid architecture, the power supply device 1 for space saving can be constructed in a computer system by fixing the set of the power supply units 4 with fixing pieces, screw-joint pieces for example, at the joint portion, 251' of the fix-to-joint portion 25 bent inward on the case 2.

Figure 4:
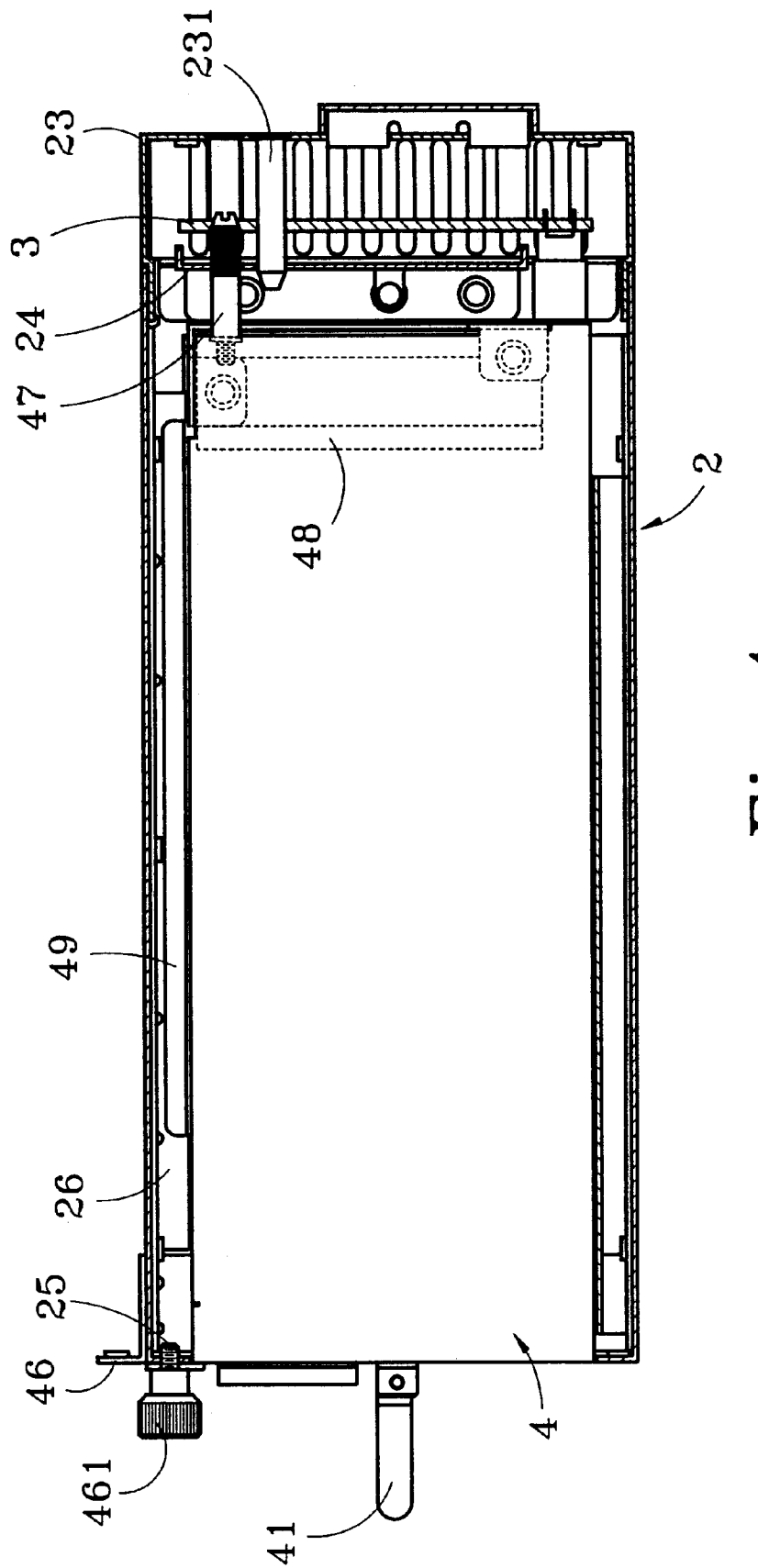
FIG. 4 is a cutaway sectional view showing a partial structure of this invention.

Referring to FIG. 3A and FIG. 4 an exploded structural view and a sectional view of this invention in loading the power supply units 4 into the case 2, aim those two wings of the slide tracks 49 on each power supply unit 4 at the correspondent gaps 252 in the fix-to-joint portion 25, then guide the power supply unit 4 to enter the compartment 22 of the case 2 along the guideways 26 to have its positioning pin 47 penetrated through the positioning hole 31 to aide positioning of the power-control panel 3, and screw the assemble-to-joint piece 461 of the fix-to-mount portion 46 forward to joint with the joint portion 251 in the fix-to-joint portion 25 to thereby fix the power supply unit 4 in the case 2 to complete assembly of the power supply device 1.

As the size of the case 2 conforms to that of the general PS/2 specifications and the fix-to-joint portion 25 is bent inward, hence, a predetermined height of assembly space is unnecessary. The power supply device 1 can be installed in a computer system by using fixing pieces (not shown) to penetrate and to be retained at the joint portion 251' directly for expanding the space available in the computer system.

In addition, each power supply unit 4 of this invention is provided with a power-input port 43 and an ON/OFF switch 44 respectively instead of a single one power-input port 43 in a prior power supply device 1 in PS/2 specifications to ensure a better operational efficiency.

Although, this invention has been described in terms of preferred embodiments, it is apparent that numerous variations and modifications may be made without departing from the true spirit and scope thereof, as set forth in the following claims.

What is claimed is:

1. An improved power supply device for a computer system, said power supply device being arranged to be disposed in a computer system to provide a back-up power supply, comprising:

a case including a partition plate which defines at least one set of compartments; a power-control panel disposed at one end of the case, and terminal edges at another end of the case; wherein each terminal edge at another end of said case is bent inwardly to form an attachment portion, and a plurality of predetermined fastener-receiving portions is formed in said attachment portion; and at least one set of power supply units disposed in said compartments and connected with said power-control panel; and wherein said inwardly bent attachment portion is arranged to receive fasteners for fixing said power supply device in said computer system by assembling fasteners to said fastener-receiving portions for building a space saving power supply device.

2. The improved power supply device for a computer system as claimed in claim 1, wherein a mounting portion is arranged on one end of each of said power supply units at a position corresponding to said fastener-receiving portions and arranged to be secured to said fastener-receiving portions by said fasteners for fixing said power supply unit in said case.

3. The improved power supply device for a computer system as claimed in claim 1, wherein a positioning pin and a positioning hole are respectively disposed at corresponding positions on said power supply unit and said power-control panel for fixing said power supply to said control panel.

4. The improved power supply device for a computer system as claimed in claim 1, further comprising an air frame including a plurality of vent openings and secured at said one end of said case; and a shield board with a plurality of heat dissipation holes located between said power-control panel and said compartments.

5. The improved power supply device for a computer system as claimed in claim 1, wherein one set of guideways and one set of slide tracks are respectively disposed at corresponding positions on an inner wall of said case and on an outer wall of said power supply units respectively at corresponding positions.

6. The improved power supply device for a computer system as claimed in claim 1, wherein one set of heat dissipation fans is arranged at one end of said power supply unit, and a plurality of heat dissipation holes at the other.

7. The improved power supply device for a computer system as claimed in claim 1, wherein a power input port, and ON/OFF switch, and a set of pilot lights are disposed on each said power supply unit.

* * * * *